United States Patent [19]

Uchiyama et al.

[11] Patent Number: 4,875,932
[45] Date of Patent: Oct. 24, 1989

[54] APPARATUS FOR MEASURING A FLOW RATE

[75] Inventors: Yoshichika Uchiyama, Hino; Atsushi Tsuchiya, Hachioji, both of Japan

[73] Assignee: Cosmo Instruments Co., Ltd., Tokyo, Japan

[21] Appl. No.: 285,798

[22] Filed: Dec. 16, 1988

[30] Foreign Application Priority Data
May 26, 1988 [JP] Japan .................................. 63-129882

[51] Int. Cl.$^4$ .............................................. G01F 5/00
[52] U.S. Cl. .................................. 73/202; 73/861.74; 73/198
[58] Field of Search .................. 73/202.5, 202, 861.74, 73/861.53, 198

[56] References Cited

U.S. PATENT DOCUMENTS

| | | | |
|---|---|---|---|
| 1,964,775 | 6/1934 | Stuart | 73/202 |
| 3,683,692 | 8/1972 | Lafitte | 73/202.5 |
| 4,571,996 | 2/1986 | Wakeman et al. | 73/202.5 |
| 4,729,244 | 3/1988 | Furuse | 73/861.74 |

Primary Examiner—Joseph A. Orsino
Assistant Examiner—Hollis T. Chen
Attorney, Agent, or Firm—Weiser & Stapler

[57] ABSTRACT

An apparatus for measuring a flow rate of a fluid such as a gas, having a by-pass passage, a measurement passage, a cantilever-shaped pressure-receiving plate in the measurement passage and a deflection detector for measuring an amount of deflection of the pressure-receiving plate.

5 Claims, 2 Drawing Sheets

APPARATUS FOR MEASURING A FLOW RATE

BACKGROUND OF THE INVENTION

The present invention relates to an apparatus for measuring a flow rate of a fluid such as a gas.

Various apparatuses are known which are employed for measuring the flow rate of a fluid. The present applicant has made a proposal in the specification of U.S. Pat. No. 4,729,244 concerning an apparatus for measuring a flow rate employing a cantilever-shaped pressure-receiving plate. This apparatus is characterized by having, in addition to a structure for measuring the flow rate of a fluid by means of the cantilever-shaped pressure-receiving plate, a variable orifice structure formed by a by-pass passage provided in the flow passage of the fluid and a cantilever-shaped valve provided in the by-pass passage. In this apparatus, the amount of fluid flowing through the by-pass passage is controlled in accordance with the flow rate of the fluid, thereby enabling the flow rate to be measured over a wide range covering low flow-rate regions and high flow-rate regions; further, the measurement range can be changed simply by varying the diameter of the by-pass passage.

The flow rate measuring apparatus previously proposed by the applicant, however, encounters the following disadvantageous phenomenon. Because of the variable orifice structure in which a cantilever-shaped valve is specially provided in the by-pass passage, if the fluid to be measured flows at certain flow rates within the wide range covering high as well as low flow-rate regions, the fluid flows without forming a laminar flow. In such cases, erratic movement or fluctuation of the fluid may cause the valve to vibrate to a not negligible extent. The vibration of the valve may, in turn, amplify the fluctuation of the fluid, and, if the resultant movement of the fluid is transmitted to the cantilever-shaped pressure-receiving plate provided for measurement, the result is that the apparatus will fail to achieve stable measurement.

SUMMARY OF THE INVENTION

An object of the present invention is to provide an apparatus for measuring a flow rate which is capable of effectively preventing fluctuation of the fluid to be measured, and which is thus capable of performing stable measurement over a wide range covering low flow-rate regions and high flow-rate regions.

According to the present invention, the above-stated object thereof is achieved by
  an apparatus for measuring a flow rate of a fluid comprising;
  (a) a body having an inlet and an outlet
  (b) a by-pass passage defined between said inlet and said outlet inside said body and forming a part of a flow passage through which said fluid flows for allowing a first portion of said fluid to flow therethrough, a flow rate of said first portion of said fluid being not measured,
  (c) a measurement passage defined between said inlet and said outlet inside said body, forming another part of said flow passage for allowing a second portion of said fluid to flow therethrough and including a measurement hole and an introducing hole, said introducing hole being disposed on an upstream side of said measurement hole and having an opening area lager than that of said measurement hole for introducing said second portion of said fluid to said measurement hole, a flow rate of said second portion of said fluid being measured,
  (d) a plurality of first fine tubes disposed in said by-pass passage for straightening a flow of said first portion of said fluid passing through said by-pas passage,
  (e) a plurality of second fine tubes disposed in said introducing hole for straightening a flow of said second portion of said fluid passing through said introducing hole,
  (f) a flexible cantilever-shaped pressure-receiving plate disposed on a downstream side of said measurement hole in such a manner as to face a flow of said second portion of said fluid from said measurement hole and thus intersect substantially orthogonally said flow from said measurement hole at one end thereof and fixed to said body at the other end thereof, and
  (g) a deflection detector for measuring an amount of deflection of said pressure-receiving plate.

The apparatus according to the present invention is capable of performing stable measurement over a wide range covering low flow-rate regions and high flow-rate regions, practically without causing any fluctuation of the fluid to be measured.

With the apparatus of the present invention, the amount of deflection of the flexible cantilever-shaped pressure-receiving plate, which receives the working pressure applied by the second portion of the fluid flowing from the measurement hole and is deflected in proportion to the flow rate of the second portion of the fluid, is detected by a deflection detector, thereby converted to the flow rate of the second fluid-portion. Thus, the flow rate of the entire fluid to be measured is indirectly measured from the flow rate of the second portion of the fluid because the former flow rate has a predetermined relationship with the latter.

According to the apparatus of the present invention, when the first portion and the second portion of the fluid respectively pass through the plurality of first fine tubes and the plurality of second fine tubes, the flows of the first portion and the second portion of the fluid are straightened. Thus, the straightened flows form approximately laminar flows, thereby making it possible to prevent the generation of swirling of the fluid. Accordingly, it is possible to prevent the fluctuation of the first portion of the fluid in the by-pass passage and that of the second portion of the fluid in the measurement hole, and, hence, it is possible to prevent vibration of the cantilever-shaped pressure-receiving plate.

The present invention avoids the use of the conventional cantilever-shaped valve which is provided in the conventional by-pass passage for the purpose of throttling but which tends to amplify the fluctuation of the fluid. Instead, in the apparatus of the present invention, the plurality of first fine tubes act as a throttle for the by-pass passage; therefore, the fluctuation of the first fluid-portion can be more positively prevented.

As discussed above, with the apparatus of the present invention, the fluid is passed through the by-pass passage and the introducing hole which are provided with a plurality of fine tubes, whereby the flows of the fluid are straightened. Therefore, the generation of swirling of the fluid or the like is prevented, thereby making it possible to effectively prevent fluctuation of the fluid and, hence, to prevent the vibration of the cantilever-shaped pressure-receiving plate, whereby stable measurement of the flow rate is enabled. Further, since the straightening of the fluid by the plurality of fine tubes is effected over a wide range covering low flow-rate regions and high flow-rate regions, stable measurement of the flow rate is enabled over a wide range.

As for the body according to the present invention, it is preferred the body comprising a main body and a sub body disposed on a downstream side of the main body, wherein the by-pass passage includes a first by-pass hole in the main body and a second by-pass hole in the sub body, the plurality of first fine tubes are disposed in the second by-pass hole, the measurement hole and the introducing hole are disposed in the main body, and the pressure-receiving plate is fixed to the main body, wherein it is further preferred each of said second by-pass hole and said introducing hole has a hexagonal cross-section.

As for the deflection detector according to the present invention, a detection coil is preferred.

As for the fine tubes according to the present invention, it is preferred that the first fine tubes and the second fine tubes have a same inner diameter.

DETAILED DESCRIPTION OF THE PREFERRED EMBODIMENT

One embodiment of the present invention will be described with reference to the drawings.

Figure 1:
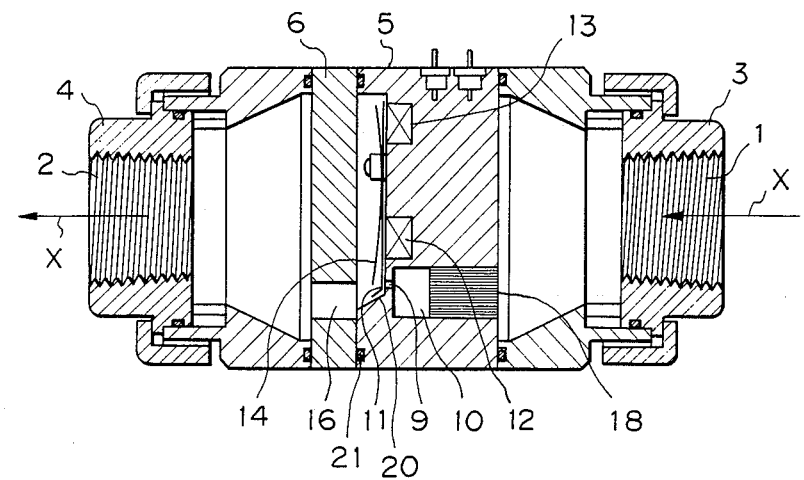
FIG. 1. is a sectional view used to explain one embodiment of the present invention.

Referring to FIG. 1, a fluid (gas) to be measured flows from an inlet port 1 to an outlet port 2 in the direction indicated by arrows X.

A piping connector 3 is provided at the inlet port 1, while another piping connector 4 is provided at the outlet port 2. A sub body 6 is provided downstream of a main body 5.

Figure 2:
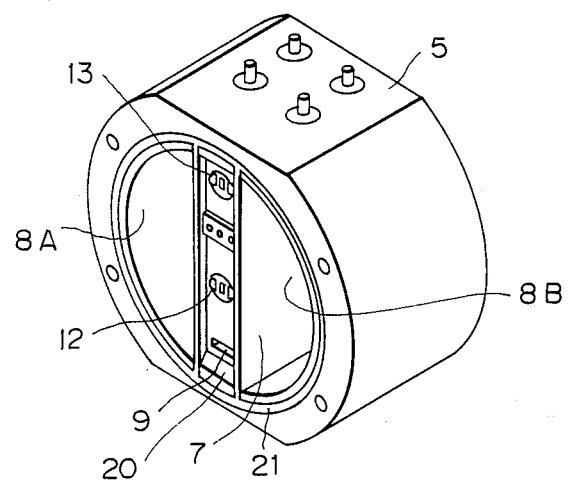
FIG. 2. is a perspective view used to explain the structure of the main body according to the present invention.

As shown in FIG. 2, the main body 5 has a wall 7 at a central portion thereof, a pair of crescent-shaped first by-pass holes 8A and 8B which are formed on either side of the central wall 7 and which form part of a by-pass passage, and a measurement hole 9 extending through a portion of the wall 7. The main body 5 is provided with a sealing member 21 on the surface facing to the sub body 6 in order to seal the possible gap between them.

The hole 9 has a slit-shaped cross-section. A flexible cantilever-shaped pressure-receiving plate 11 is provided on the downstream side of the hole 9. The plate 11 comprises a spring member formed of a magnetic material. The amount of deflection of the plate 11 is detected by a detecting coil 12 disposed in correspondence with one free end of the plate 11. A compensating coil 13 is disposed in correspondence with the other free end of the plate 11, so as to enable null-gravity balance compensation. A stopper plate 14 is provided to protect the plate 11. According to the preferred embodiment of the present invention, the shape of the face 20 of the wall 7 which the plate 11 faces at one end thereof may be adjusted by a known method, so that the amount of deflection of the plate 11 changes in direct proportion to the flow rate of the fluid flowing through the hole 9.

Figure 3:
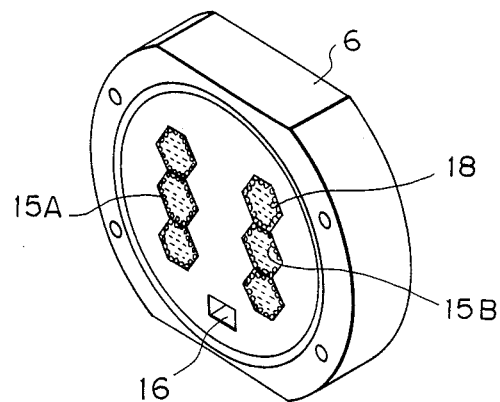
FIG. 3. is a perspective view used to explain the structure of the sub body employed according to the present invention.
Figure 4:
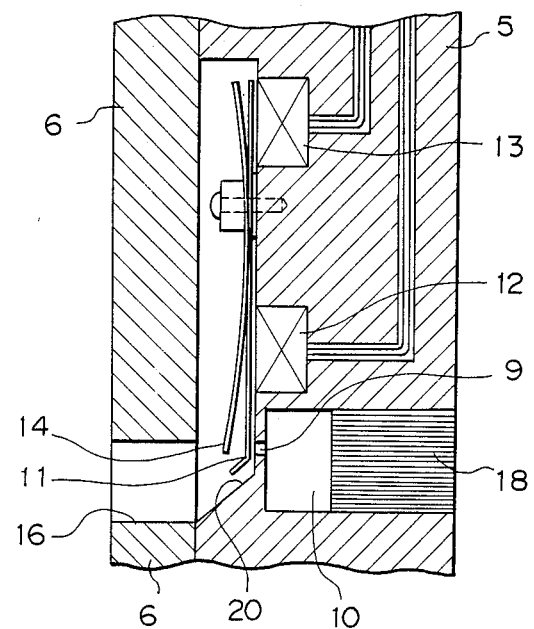
FIG. 4 is an enlarged sectional view used to explain the structure of essential parts of the main body.

One of the main characteristics of the present invention is structures provided in the sub body 6 and in a portion of the main body 5 on the upstream side of the hole 9. As shown in FIG. 3, the sub body 6 is generally formed in a shape of a flat plate. The generally flat sub body 6 is formed with second by-pass holes 15A and 15B, each having a hexagonal cross-section and communicating with the first by-pass holes 8A and 8B. The sub body 6 is also formed with a hole 16 at a portion on the downstream side of the hole 9 formed in the main body 5. Further, as shown in FIGS. 1 and 4, the main body 5 is formed with an introducing hole 10 for a measurement-fluid at a portion thereof which is upstream of the hole 9. The hole 10 has an opening area larger than the opening area of the hole 9.

A multiplicity of fine tubes 18 are disposed in the holes 15A and 15B forming part of the by-pass passage and in the hole 10, for the purpose of straightening the flow of the fluid. The fine tubes 18 have an inner diameter of, for instance, about 0.5 mm. The fluid flows through the fine tubes 18 whereby the flow of the fluid is straightened.

Each of the holes 15A and 15B and the hole 10 has a hexagonal cross-section. With such a hexagonal configuration, these holes can stably receive the fine tubes with a small diameter. This would be understood by considering a case where a multiplicity of tubes are bundled; the bundled tubes naturally form a hexagonal shape. This is why a hexagonal configuration is adopted for the holes 15A and 15B and the hole 10.

As described above, according to the embodiment of the present invention, the multiplicity of fine tubes 18 are provided in the by-pass passage and in the hole 10, so that all of the fluid which is being by-passed and the fluid which is to flow into the hole 9 passes through the fine tubes 18. The fluid flows through the fine tubes 18, whereby the flow of the fluid is straightened and the generation of swirling or the like is prevented, thereby preventing fluctuation of the fluid.

In particular, the provision of the fine tubes 18 in the hole 10 allows the fluid which is to flow into the hole 9 to be brought into the same condition as the fluid flowing through the by-pass passage, and to be straightened, whereby fluctuation of the fluid is prevented, and vibration of the plate 11 can be effectively prevented.

With the vibration of the plate 11 being prevented in this way, the flow rate of the fluid can be stably converted into electric signals.

In addition, the flow-straightening action of the fine tubes 18 is provided over a wide range covering low as well as high flow-rate regions, thereby enabling the apparatus to measure the flow rate over a wide range.

Many widely different embodiments of the present invention may be constructed without departing from the spirit and scope of the present invention. It should be understood that the present invention is not limited to the specific embodiments described in this specification, except as defined in the appended claims.

What is claimed is:

1. An apparatus for measuring a flow rate of a fluid comprising;
  (a) a body having an inlet and an outlet
  (b) a by-pass passage defined between said inlet and said outlet inside said body and forming a part of a flow passage through which said fluid flows for allowing a first portion of said fluid to flow therethrough, a flow rate of said first portion of said fluid being not measured, (c) a measurement passage defined between said inlet and said outlet inside said body, forming another part of said flow passage for allowing a second portion of said fluid to flow therethrough and including a measurement hole and an introducing hole, said introducing hole being disposed on an upstream side of said measurement hole and having an opening area larger than that of said measurement hole for introducing said second portion of said fluid to said measurement hole, a flow rate of said second portion of said fluid being measured, (d) a plurality of first fine tubes disposed in said by-pass passage for straightening a flow of said first portion of said fluid passing through said by-pass passage, (e) a plurality of second fine tubes disposed in said introducing hole for straightening a flow of said second portion of said fluid passing through said introducing hole, (f) a flexible cantilever-shaped pressure-receiving plate disposed on a downstream side of said measurement hole in such a manner as to face a flow of said second portion of said fluid from said measurement hole and thus intersect substantially orthogonally said flow from said measurement hole at one end thereof and fixed to said body at the other end thereof, and (g) a deflection detector for measuring an amount of deflection of said pressure-receiving plate.

2. An apparatus according to claim 1, wherein said body comprises a main body and a sub body disposed on a downstream side of said main body, said by-pass passage includes a first by-pass hole in said main body and a second by-pass hole in said sub body, said plurality of first fine tubes are disposed in said second by-pass hole, said measurement hole and said introducing hole are disposed in said main body, and said pressure-receiving plate is fixed to said main body.

3. An apparatus according to claim 1 or 2, wherein said deflection detector is a detecting coil.

4. An apparatus according to claim 1 or 2, wherein said second fine tubes and said first fine tubes have a same inner diameter.

5. An apparatus according to claim 2, wherein each of said second by-pass hole and said introducing hole has a hexagonal cross-section.

* * * * *